(12) United States Patent
Van Boekel

(10) Patent No.: US 6,712,597 B1
(45) Date of Patent: Mar. 30, 2004

(54) INJECTION-MOULDING DEVICE

(76) Inventor: Franciscus Antonius Jozef Van Boekel, Voorstraat 119, NL-3311 EN Dordrecht (NL)

( * ) Notice: Subject to any disclaimer, the term of this patent is extended or adjusted under 35 U.S.C. 154(b) by 0 days.

(21) Appl. No.: 10/069,863

(22) PCT Filed: Aug. 24, 2000

(86) PCT No.: PCT/NL00/00591

§ 371 (c)(1),
(2), (4) Date: Jun. 27, 2002

(87) PCT Pub. No.: WO01/15884

PCT Pub. Date: Mar. 8, 2001

(30) Foreign Application Priority Data

Aug. 27, 1999 (NL) .............................................. 1012925

(51) Int. Cl.[7] .............................................. B29C 45/20
(52) U.S. Cl. .............. 425/190; 264/328.15; 425/192 R; 425/549
(58) Field of Search ............................ 425/190, 192 R, 425/549, 562, 563, 564, 565, 566, 144; 264/328.15

(56) References Cited

U.S. PATENT DOCUMENTS 3,676,535 A * 7/1972 Juel ....................... 425/192 R
5,853,631 A * 12/1998 Linehan ....................... 425/144
5,955,121 A * 9/1999 Gellert et al. ............... 425/549
6,394,784 B1 * 5/2002 Gellert et al. ............... 425/549

FOREIGN PATENT DOCUMENTS

| DE | 4312153 A | 10/1994 |
| DE | 4320584 A | 1/1995 |
| DE | 4324027 A | 1/1995 |
| EP | 0437777 A | 7/1991 |
| WO | 9812038 A | 3/1998 |

* cited by examiner

Primary Examiner—Tim Heitbrink
(74) Attorney, Agent, or Firm—Webb Ziesenheim Logsdon Orkin & Hanson, P.C.

(57) ABSTRACT

The invention relates to an injection-moulding device for injection moulding of plastic objects, having a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, which sealing element is provided clampingly on the structural components.

27 Claims, 3 Drawing Sheets

INJECTION-MOULDING DEVICE

BACKGROUND OF THE INVENTION

1. Field of the Invention

The invention relates to an injection-moulding device.

2. Description of the Related Art

These injection-moulding devices are also referred to in the art as hot runners, wherein the flow channel for the plastic melt in the device is held at process temperature, whereby the plastic present in the mould can be re-used for a subsequent production cycle. The flow channel is generally embodied in metal and equipped with heating elements and thermocouples, wherein control equipment is present to set a suitable temperature.

A critical component in such injection-moulding devices are the seals. A known seal is formed by a sealing ring which is enclosed with a sufficiently large bias between two parallel surfaces. The ring can be either solid or hollow, wherein the hollow ring has the advantage that liquid plastic will flow into the ring and will contribute toward the sealing action. In such a known seal both the parallel surfaces are at right angles to the channel. The plastic pressure will then press apart both the structural parts of which the sealing surfaces form part. The bias of the ring must therefore be at least as great as the occurring plastic pressure times the projected area of the channel for sealing. This sealing action will be adversely affected by possible movements of the structural parts in axial direction relative to each other.

Such hot runners are moreover subject to considerable pressures of up to 2000 bar and temperatures of about 480° C. This makes considerably more difficult the sealing action for transverse separating surfaces in the flow channel. These transverse separating surfaces are for instance present between the manifold and the nozzles connected to the manifold and between parts of the nozzles themselves.

Known from DE 43 24 027 is a sealing ring for bridging transverse separating surfaces between modular components of an injection-moulding device. This known injection-moulding device is applied for the injection moulding of elastomeric objects, wherein wholly different operating conditions occur than in the case of hot runners. The operating temperature is for instance considerably lower.

BRIEF SUMMARY OF THE INVENTION

The invention has for its object to obviate the above stated drawback in hot runners and provides for this purpose an injection-moulding device as according to claim 1. By arranging a sealing element clampingly in the flow channel a sealing is obtained of the surface which is concentric to the flow channel.

The sealing element is preferably provided on the structural components with shrink fit in the diameter and optionally an overmeasure in the dimension in axial direction. In the case of a shrink fit the sealing element is arranged in the flow channel with an overmeasure in the diameter while temperature is decreased, for instance with nitrogen. A relatively large bias can be obtained with shrink fitting. When an overmeasure in the dimension in axial direction is also applied, a sealing action is obtained in the case of two mutually perpendicular surfaces.

Since the seal parallel to the flow channel is more critical than transversely thereof, the sealing element is preferably formed by a cylindrical bush, wherein the ratio of the diameter of the flow channel, wall thickness of the bush and height of the bush equals 22:2:10. The plastic pressure will press the thin-walled bush against the wall of the flow channel. The higher the plastic pressure, the better the sealing action will be. Should both structural components move axially or rotate relative to each other, the sealing capacity will not then be affected, or only slightly.

BRIEF DESCRIPTION OF THE SEVERAL VIEWS OF THE DRAWING

The invention will be better understood in the light of the detailed description given below of a number of preferred embodiments with reference to the annexed drawing. Herein.

DETAILED DESCRIPTION OF THE INVENTION

Figure 1:
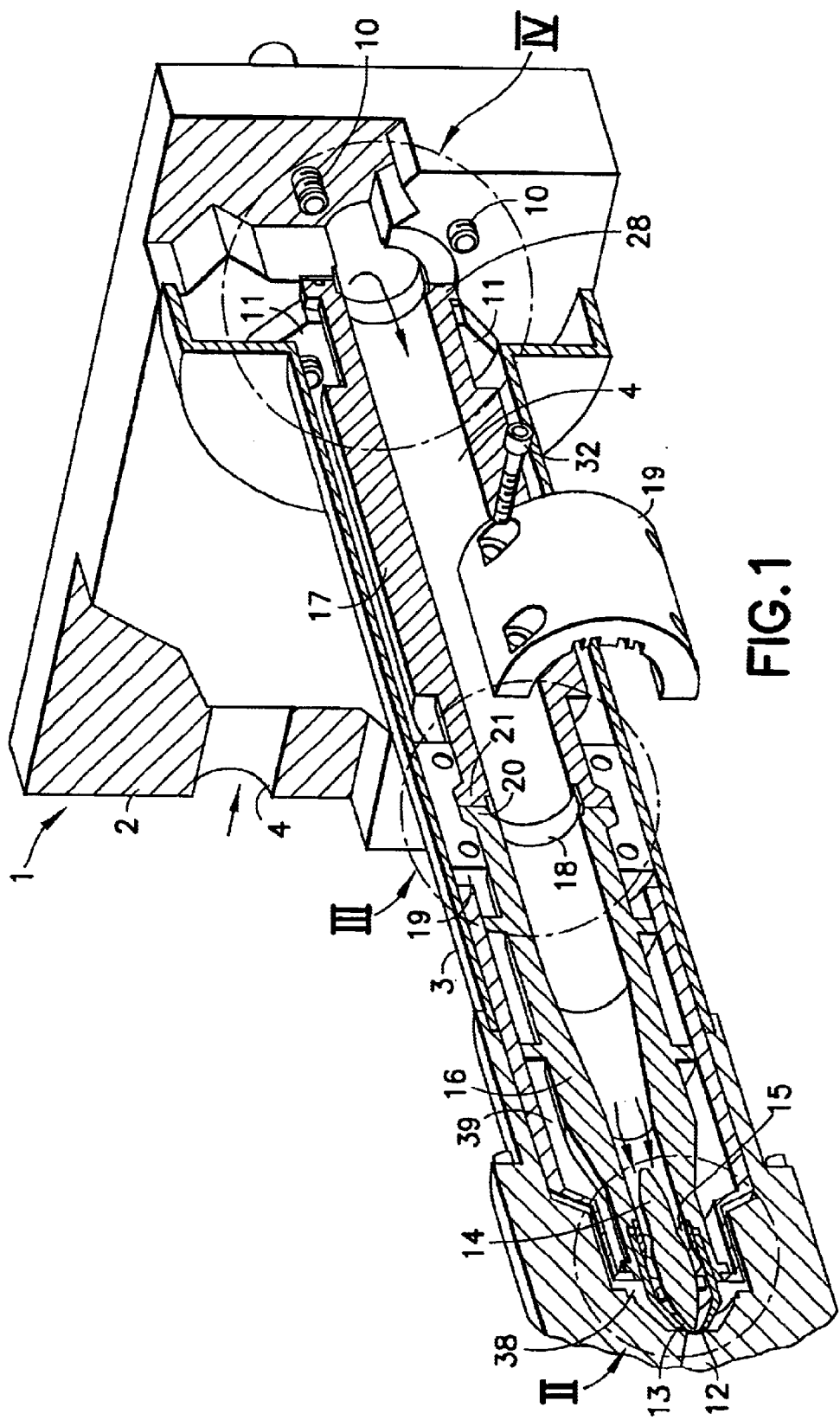
FIG. 1 shows a perspective, partly broken away view of a detail of an injection-moulding device according to the invention.
Figure 3:
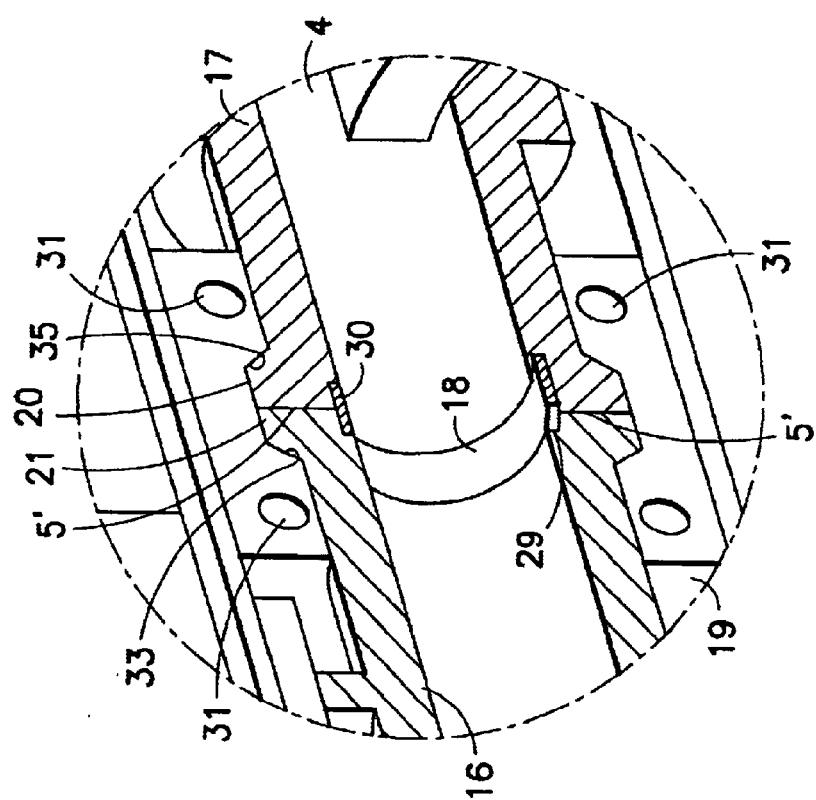
FIGS. 2, 3 and 4 show enlarged perspective views of the sectors II, III and IV of FIG. 1.

FIG. 1 shows a broken-away mould 1 of an injection-moulding device according to the invention in which a manifold 2 runs out onto a nozzle 3. A flow channel 4 extends through manifold 2 and nozzle 3. The flow channel 4 for a plastic melt forms an angle with nozzle 3. Such a flow channel 4 has a number of transverse separating surfaces 5, 5' for which a seal must be provided. The transverse separating surface 5 is present between manifold 2 and nozzle 3, the transverse separating surface 5' is present between components of the nozzle 3 itself.

Figure 4:
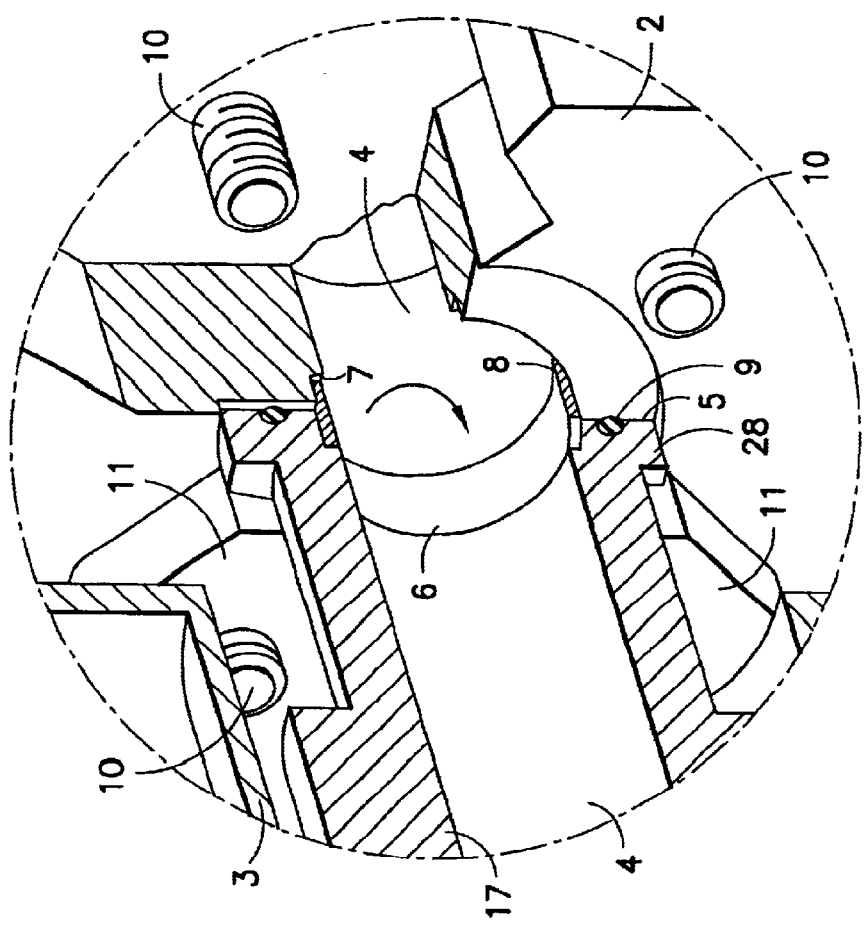

The seal 6 between the structural components, manifold 2 and nozzle 3 is elucidated in the detail view of FIG. 4. A sealing element 6 is provided in flow channel 4 and is formed by a thin-walled bush which is placed with shrink fitting in two cylindrical recesses 7, 8 arranged in nozzle 3 and manifold 2. The passage of flow channel 4 hereby remains constant.

Seal 6 is arranged such that the plastic pressure in the flow channel will press the thin-walled bush with its back against the cylindrical recesses 7, 8 of the two structural parts 2, 3, thereby reinforcing the sealing action. Seal 6 extends over the contact surfaces between the two structural parts. The higher the plastic pressure, the better the sealing action will be. If both components move slightly relative to each other (axially or rotation), the sealing function will still be maintained. The sealing surfaces are preferably concentric to flow channel 4.

Seal 6 should preferably be made from a high chromium content steel alloy in order to keep the tensile strength as low as possible so as to facilitate deformation of the bush. In order to avoid scoring, a hard surface layer will preferably have to be applied. At a channel diameter of for instance 22 mm, the wall thickness of the bush will be roughly 2 mm and the height about 10 mm. At other channel diameters these dimensions will also change proportionally. In addition, the sealing bush preferably has an over measure in its height of 0.4 to 1.0% and is placed for instance with a shrink fit of H7p6 (NEN 2807) in the flow channel.

The shown device is provided in this transverse separating surface 5 with an additional, independently acting seal 9. Should the first seal fail, the second seal will then take over its function. The hollow sealing rings 9 are provided for this purpose.

An injection-moulding device is assembled in mould 1 when the two have the same temperature. Once in production, the injection-moulding device will be about 200° C. hotter than mould 1. The injection-moulding device will expand relative to mould 1. In the case of a manifold 2 with a length of 1000 mm, this will be about 3 mm. The thickness of the manifold will however also become greater, as will the length of nozzles 3.

Two known techniques are currently used to provide space for this expansion, i.e. the sliding construction and the screwed construction.

The drawbacks of the sliding construction are: A danger with the sliding construction is that the sealing between the nozzle and the manifold only comes about at process temperature. Assembly will therefore have to take place very precisely (accurate to hundredths of millimeters).

In order to realize the bias, heavy structural parts are necessary between injection-moulding device and mould. This has the result that much energy is lost in the form of heat and that cold locations are created in the injection-moulding device.

An injection-moulding device based on a sliding construction cannot be supplied as a fully finished system. The nozzles are not connected fixedly to the manifold. Wiring of the system will not therefore be carried out by the injection-moulding device supplier. This saves cost which will be manifest in the ordering price.

The screw method is applied, if possible. Owing to the expansion of the manifold the upper end of the nozzle will be moved along. The lower end is held in the mould and will thus remain in position. The nozzle is thus forced to bend. Note that these can be tubes with an outer diameter of 42 mm and a wall thickness of 10 mm. There are therefore limitations to this method. If this method cannot be applied, recourse is had to the sliding method.

The drawbacks of the screwed construction are: It frequently occurs that a plastic product is formed which has a specifically formed surface at the position of the gate. This means that the outflow opening must be modified to the form of the product. In the case of a repair where the nozzle is disassembled, it is not possible in the screwed construction to re-place the outflow opening in precisely the same position. It is suddenly found that components can be tightened just a little further.

In order to counter this a construction is available wherein use is made of a wing nut providing the connection between the nozzle and the manifold. This solves the problem at this location. The problem persists however in the case of the screw outflow opening.

Another drawback is that the nominal screw thread diameter becomes very large. Screw tightening of the nozzle or of the wing nut wherein the correct bias is realized is difficult to perform in practice because the required tightening moment is very great. Disassembly is consequently very difficult. The danger of scoring of the screw thread is always present.

The component with outflow opening (gate insert) is fixedly connected to the nozzle. The manifold is fixed in the mould. This means that in the case of thermal expansion of the nozzle the gate insert will be displaced in axial direction in the mould. In order to realize the correct thermal properties in the outflow opening constrictions are arranged in the component. Failure of the gate insert at the position of the constriction is a regular occurrence as a consequence of the high friction forces between insert and mould.

It is possible to point to a further reason why these gate inserts break. The lateral forces which ensure that the nozzle really does bend must be transmitted by the mould via the insert to the nozzle. The stresses at the position of the constriction in the gate insert will thereby become high. These are increased even further because the insert, as a result of the bending of the nozzle, will also have to bend (in opposing direction). This will of course take place at the position of the constriction.

These drawbacks are at least partly obviated by the device as in the present invention where the structural components defining the transverse separating surface are formed by the manifold and nozzle, or where the nozzle is mounted on the manifold by means of a number of independently controllable connecting elements, or where a connecting plate is formed by a nut and bolt assembly.

The connection between manifold 2 and nozzle 3 is obtained with two, and preferably four independently controllable connecting elements. In the drawings 1 and 4 these take the form of a nut and bolt 10 assembly, wherein the nut is preferably formed by a clamp plate 11. Bolts 10 extend through an opening provided for this purpose in manifold 2, screwed into the clamping plate 11 on the opposite side of the manifold 2. The clamping plates 11 in turn engage the shoulder part 28 of nozzle 3, whereby nozzle 3 is clamped fixedly against manifold 2.

The advantages hereof are that after disassembly the nozzle can be re-placed in exactly the same position, the tightening moments for the bolts are reasonable whereby assembly and disassembly will be simple to realize, and that due to their small size bolts and clamp plates can be readily and cheaply provided with an anti-scoring layer. A particular form of the connection between manifold 2 and nozzle 3 is the use of an adaptor nozzle.

When a short nozzle is mounted on the end of a long manifold, the proposed upgraded construction with bolts and clamp plates will not perform better than the known constructions. The proposed improvement shown hereinafter is the specific solution to this problem. At the height of the position of the nozzle a short adaptor nozzle is mounted transversely on top of the manifold. The connection is made such that a small angular displacement is possible between the two structural components.

When the manifold expands and the short nozzle is held in its position, the adaptor nozzle will assume a different angle relative to the manifold. The distance over which the nozzle is urged toward the manifold as a consequence of this rotation is compensated by the thermal expansion of the adaptor nozzle. In this way there will be no destructive forces present in the construction.

Figure 2:
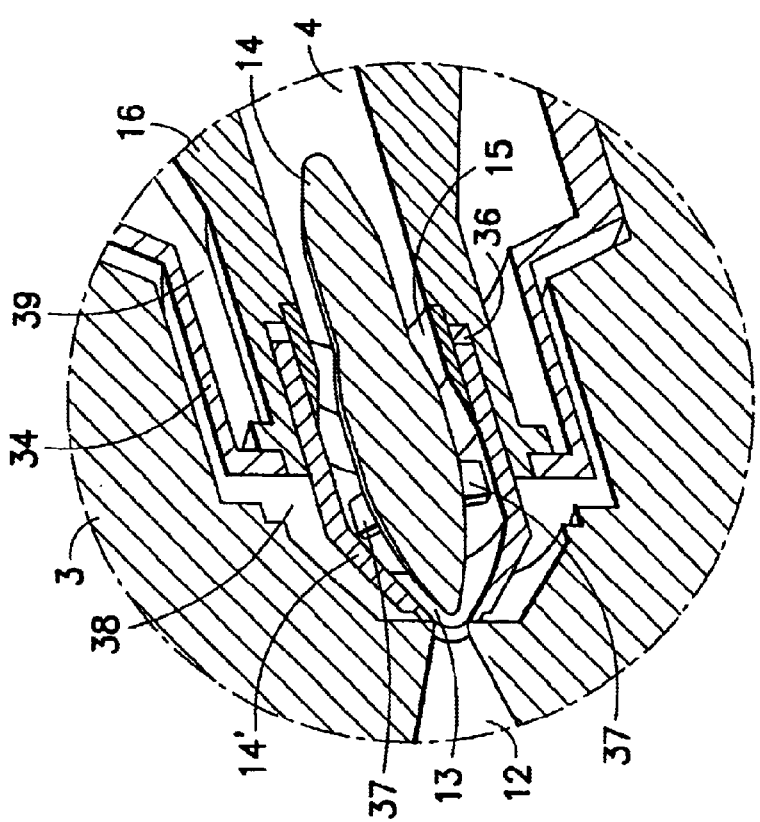

FIG. 2 shows in detail the gate 13 of nozzle 3 which debouches into the mould cavity 12.

Provided centrally in flow channel 4 is a torpedo 14 which is coupled by means of three spokes 37 to the intermediate wall part 14' of the foremost nozzle part 16 in order to facilitate the heat transport toward torpedo 14 and gate 13.

A wedge-shaped sleeve 15 extends over the expansion space 36 in a recess, whereby blind areas are avoided in which plastic material can possibly result in blockages.

The mutually coupled assembly of components 14, 37 and 14' lies mounted displaceably in longitudinal direction of flow channel 4. This assembly will slide forward (to the left in the drawing) against mould 1 or against a component (not shown) mounted in mould 1. This displacement force is generated by the loss of pressure in the flow injection over this assembly.

Nozzle 3 comprises a number of transverse structural components 16, 17 mutually separated by a transverse separating surface 5'. The sealing between components 16 and 17 is likewise formed by a sealing element or sealing ring 18 which extends over transverse separating surface 5'. Sealing ring 18 lies in the corresponding recesses 29 and 30. A screw-in is applied to fixedly connect nozzle parts 16, 17. A known problem in the prior art which occurs here is that the mutual positioning is not predictable, which generally results in problems.

The connection of these two parts 16, 17 is realized according to the invention by means of two semi-circular clamping plates 19 for enclosing the outer periphery of nozzle parts 16, 17. Openings 31 are provided in this clamping plate 19 for screwing thereof against the other clamping plate 19. The outer periphery of the nozzle parts is preferably provided with a stepped portion 20, wherein clamping plate 19 comprises a corresponding recess 21. The inner side is preferably provided with two chamfered surfaces 33. These surfaces coincide with the inclining surfaces on the two parts for mutual connection. When the semi-circular plates 19 are pulled toward each other by means of for instance bolts 32, both nozzle parts 16, 17 will be pressed toward each other and assume a permanent fixed position.

Reference number 34 represents a fixation element that connects to the foremost nozzle part 16, as illustrated in FIG. 2. Reference number 38 represents a cavity defined by a distal part of nozzle 3. The cavity 38 extends about the fixation element 34. Reference number 39 represents a cavity formed by the fixation element 34 and extends about the nozzle part 16. Additionally, as shown in FIG. 1, the fixation element 34 makes contact with nozzle 3 on the larger outer diameter. In this way, the outflow opening of the cavity 38 is kept in line with the mould cavity 12 in spite of the thermal expansion of manifold 2, which causes the nozzle parts 16 and 17 to move radially with respect to their common axes. Thereby, in case of a possible leakage of plastic flowing to cavity 38, fixation element 34 ensures that plastic will not flow further than the point of contact between the fixation element 34 and the nozzle 3.

The invention further relates to improvements in the temperature control and wiring protection.

It is not usual for wiring on injection-moulding devices to be fully protected by metal constructions. It is known that, during transport of the injection-moulding device and during assembly of an injection-moulding device in a mould, damage often occurs to the wiring of the injection-moulding device. The solution has heretofore been sought in better protection of the wiring by means of flexible metal hoses or braided metal hoses. These hoses provide protection in each case to five wires; two wires for the heating element, two wires for the thermocouple and one wire for earth. In each case therefore, the wires for one zone. The wires themselves are usually coated with Teflon. A glass-fibre hose impregnated with silicones is often further arranged round the five wires in the metal hose. In order to prevent the connections of the wires to the heating elements and thermocouples breaking off after a short time, they are often given a robust form. These connections are generally freely accessible and therefore quickly sustain mechanical damage.

The drawbacks hereof are that mechanical damage cannot be prevented with absolute certainty and that teflon is only resistant up to 260° C. Above this is temperature the material becomes soft and the conductor can penetrate through the insulation. It is noted that process temperatures can rise to 425° C. A final drawback is that because robust solutions are chosen the connections take up much space.

These drawbacks are obviated with the measures according to the present invention where a sleeve extends over an expansion space in the gate. All wiring and all connection points are concealed from view by a metal construction. It is hereby no longer possible for mechanical damage to the wiring to occur during transport of the injection-moulding device and during assembly in the mould. Teflon is replaced by Kapton. This is resistant to higher temperatures. An additional advantage is that the insulating value of Kapton is very high. The outer diameter of the insulated wire is hereby considerably smaller. Because wiring and connection lie inside a metal construction, further protective hoses no longer have to be arranged.

The advantages hereof are that mechanical damage to wiring and connections during transport and assembly in the mould is precluded, and that the space occupied by the wiring is considerably smaller.

It is usual for one heating element or two parallel heating elements to be included per zone. In the case two are arranged, both are necessary to effect proper functioning. In an injection-moulding device there are at least four zones, although this number is generally exceeded. Injection-moulding devices with 40 to 50 zones are not unusual. An injection-moulding device no longer operates properly if one heating element fails. If two fail, the injection-moulding device usually ceases to function.

A choice is often made for heating elements of robust dimensions. As already described above, this is done mainly to reduce mechanical damage.

The drawbacks hereof are that the injection-moulding device no longer functions if one or a number of heating elements fail, and that the chosen heating elements take up a relatively large amount of space.

Owing to the complete protection of wires and connections it is no longer necessary to opt for robust heating elements. A choice is now made for heating elements of small dimensions. This choice enables the mounting of an additional heating element in the same space. This provides the option of switching to the additional heating element when the first element fails.

An advantage hereof is that it will be hereby possible for the injection-moulding device to continue functioning much longer before any action is taken to replace faulty heating elements.

It is usual for one thermocouple to be mounted per zone. If one thermocouple fails, the injection-moulding device will no longer function properly. If two or more thermocouples fail, the injection-moulding device ceases to function.

Two thermocouples are mounted per zone. For the same reason as in the case of heating elements, a choice is made for thermocouples in relatively small form. The injection-moulding device will hereby remain in operation longer before repairs must be made.

An electronic apparatus is required per heating zone to maintain the temperature as accurately as possible. Currents which have to be supplied can rise to 16 amps. It is usual at the moment for these apparatuses to have a limited functionality. They usually regulate the temperature as independent units. Such an apparatus is sometimes able to report that the element or the thermocouple has failed. It is sometimes able to report the power consumption. In some cases it is possible to have the apparatuses communicate with a PC.

A drawback hereof is that is necessary to install the correct control software per control apparatus. A memory module per unit is required for this purpose. When the software has to be updated, each unit will have to be disassembled.

The control software will now be stored in a PC. The control apparatus itself will no longer contain any intelligence. It will be in continuous connection with the PC. The measured values will be transmitted to the PC. Software is then available here which determines what the control apparatus must do. These commands are subsequently sent back again to the control unit.

The advantages hereof are that the control unit can be built in a simpler form and thus more cheaply, and that in the case of a possible software update only the software on the PC has to be upgraded.

The control apparatus will not only be connected to the main heating element and the main thermocouple, but will also be connected to the additionally mounted heating element and thermocouple. The PC will be provided with comprehensive software. If for instance a heating element were to fail, the control unit will then be able to determine this and pass this information to the PC. The PC can then give the command to switch on the second heating element.

In addition, the software can monitor all manner of things, such as for instance energy consumption. Should irregularities occur, these can then be reported. It is also possible in this way to determine the degree of wear of a heating element. It thus becomes possible to predict when an element will fail.

The advantages hereof are that the injection-moulding device will be in operation longer without intervention of staff, the reliability of the injection-moulding device will be greater, and periodic maintenance can now be planned. There will be less necessity for ad hoc maintenance.

What is claimed is:

1. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components and wherein the structural components defining the transverse separating surface are formed by the manifold and a nozzle.

2. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components, wherein the sealing element is shrink-fitted into the structural components.

3. The device as claimed in claim 2, wherein the sealing element is provided on the structural components with an overmeasure in the dimension in axial direction.

4. The device as claimed in claim 1, wherein the sealing element is formed by a cylindrical bush, wherein the ratio of the diameter of the flow channel, wall thickness of the bush and height of the bush equals 22:2:10.

5. The device as claimed in claim 1, wherein the structural components are provided with a corresponding recess for the sealing element for housing of the sealing element.

6. The device as claimed in claim 5, wherein the recess has a form and dimension such that the passage of the flow channel over the seal remains constant.

7. The device as claimed in claim 1, wherein the sealing element is manufactured from a metal alloy, for instance a high chromium content alloy.

8. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components, wherein an additional seal is provided between the structural components which is formed by self-sealing sealing rings which are arranged diametrically relative to the flow channel in the transverse separating plane.

9. The device as claimed in claim 1, wherein the nozzle is mounted on the manifold by means of a number of, preferably two, and more preferably four, independently controllable connecting elements.

10. The device as claimed in claim 9, wherein a connecting element is formed by a nut and bolt assembly, wherein the nut is preferably a clamp plate.

11. The device as claimed in claim 1, wherein an adaptor nozzle is provided between the manifold and a nozzle, wherein an angular displacement is possible between the manifold and the adaptor nozzle.

12. The device as claimed in claim 1, wherein the structural components defining the transverse separating surface are formed by nozzle parts.

13. The device as claimed in claim 12, wherein two semi-circular clamping plates are provided round the transverse separating surface for enclosing the outer periphery of the nozzle parts.

14. The device as claimed in claim 13, wherein the outer periphery of the nozzle parts is provided with a stepped portion and the clamping plates with a corresponding recess.

15. The device as claimed in claim 1, wherein the nozzle on the mould cavity runs out onto a gate, wherein the gate comprises an assembly displaceable in longitudinal direction.

16. The device as claimed in claim 15, wherein the sleeve extends over an expansion space in the gate.

17. The device as claimed in claim 1, wherein the device is provided with dual heating elements.

18. The device as claimed in claim 1, wherein the device is provided with dual thermocouples.

19. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components and wherein the structural components defining the transverse separating surface are formed by nozzle parts.

20. The device as claimed in claim 19, wherein two semi-circular clamping plates are provided round the transverse separating surface for enclosing the outer periphery of the nozzle parts.

21. The device as claimed in claim 20, wherein the outer periphery of the nozzle parts is provided with a stepped portion and the clamping plates with a corresponding recess.

22. The device as claimed in claim 19, wherein the device is provided with dual heating elements.

23. The device as claimed in claim 19, wherein the device is provided with dual thermocouples.

24. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components and wherein the device is provided with at least a pair of heating elements.

25. The device as claimed in claim 24, wherein at least a pair of heating elements is located in each structural component.

26. An injection-moulding device for injection moulding of plastic objects, comprising a mould which defines a mould cavity, in which mould is provided a flow channel for the at least partially liquid plastic, which flow channel extends through a manifold and a number of nozzles connected to the manifold, wherein the flow channel contains a number of transverse separating surfaces between structural components, and at least one transverse separating surface is bridged by a sealing element in the flow channel, wherein the sealing element is provided clampingly on the structural components and wherein the device is provided with at least a pair of thermocouples.

27. The device as claimed in claim 25, wherein at least a pair of thermocouples is located in each structural component.

* * * * *